(12) United States Patent
Pollock et al.

(10) Patent No.: US 8,471,510 B2
(45) Date of Patent: Jun. 25, 2013

(54) CONTROL OF ELECTRICAL MACHINES

(75) Inventors: Charles Pollock, Oakham (GB); Helen Pollock, Oakham (GB)

(73) Assignee: Technelec Ltd., Oakham (GB)

( * ) Notice: Subject to any disclaimer, the term of this patent is extended or adjusted under 35 U.S.C. 154(b) by 254 days.

(21) Appl. No.: 12/744,984

(22) PCT Filed: Dec. 1, 2008

(86) PCT No.: PCT/GB2008/003973
§ 371 (c)(1),
(2), (4) Date: May 27, 2010

(87) PCT Pub. No.: WO2009/068889
PCT Pub. Date: Jun. 4, 2009

(65) Prior Publication Data
US 2011/0037422 A1 Feb. 17, 2011

(30) Foreign Application Priority Data
Nov. 29, 2007 (GB) .................................. 0723383.6

(51) Int. Cl.
*H02P 6/16* (2006.01)
(52) U.S. Cl.
CPC ........................................ *H02P 6/16* (2013.01)
USPC ................................................ 318/400.34
(58) Field of Classification Search
CPC ......................................................... H02P 6/16
USPC ........................................ 318/400.32–400.36
See application file for complete search history.

(56) References Cited

U.S. PATENT DOCUMENTS

| 6,646,406 B1 * | 11/2003 | Pollock et al. ................ 318/599 |
| 6,788,020 B1 | 9/2004 | Pollock et al. |
| 2003/0234629 A1 | 12/2003 | Trifilo |
| 2006/0197396 A1 | 9/2006 | Pollock et al. |

FOREIGN PATENT DOCUMENTS

| EP | 1 783 891 A1 | 5/2007 |
| GB | 2 454 170 A | 5/2009 |
| GB | 2 454 171 A | 5/2009 |
| WO | 2004/025822 A1 | 3/2004 |

OTHER PUBLICATIONS

Pollock et al., "Low Cost, High Power Density, Flux Switching Machines and Drives for Power Tools", IEEE IAS Annual Meeting 2003.
Pollock et al., "Flux-Switching Motors for Automotive Applications", IEEE Transactions in Industry Applications, vol. 42, No. 5, Sep. 2006, pp. 1177-1184.
Cheng et al., "A Permanent Magnet Flux Switching Motor for Low Energy Axial Fans", Fourtieth ISA Annual Meeting Conference Record, vol. 3, Oct. 2-6, 2005, pp. 2168-2175.
Rauch et al., "Design Principles of Flux-Switch Alternators", AIEE Trans., vol. PAS-74, pp. 1261-1268, 1955.
International Search Report and Written Opinion for corresponding International Application No. PCT/GB2008/003973 mailed May 30, 2011.

* cited by examiner

*Primary Examiner* — Derek Rosenau
(74) *Attorney, Agent, or Firm* — Renner, Otto, Boisselle & Sklar, LLP

(57) ABSTRACT

An electrical machine for converting electrical energy into mechanical energy and/or mechanical energy into electrical energy, including at least one rotor position sensor device configured to undertake the steps of measuring an electrical signal during a switching cycle in an end region, and comparing the measurement with at least one similar measurement in at least one previous switching cycle to determine if a known rotor position has been reached.

12 Claims, 10 Drawing Sheets

Control of Electrical Machines

CONTROL OF ELECTRICAL MACHINES

This invention relates to the control of electrical machines and is concerned more particularly, though not exclusively, with the control of flux switching electrical machines without a mechanical shaft position sensor.

Flux switching motors can be used in many applications, since they do not require the use of commutators or brushes in supplying electrical power to the rotor of the motor. Since these components are subject to significant wear, it is highly desirable to avoid their use.

FIG. 1 shows a flux switching machine with 8 stator teeth and 4 rotor teeth as described in U.S. Pat. No. 6,788,020. This motor contains a field winding in slots 1,3,5,7 of the stator 10 and an armature winding in slots 2,4,6,8 of the stator 10. The rotor, 11, is a salient pole rotor made from laminated steel with 4 rotor teeth, 9. This motor operates with direct current in the field winding and alternating current in the armature winding. The direct current in the field winding creates a four pole stator flux pattern which links the armature winding in a positive or negative direction as the rotor turns from alignment with stator teeth 21,23,25,27 to alignment with stator teeth 22,24,26,28. This alternating flux linking the armature generates an internal emf in the armature. The machine can be used as a motor or generator by controlling the armature current to be in phase (motor) or out of phase (generator) with the armature emf. This machine provides a simple and easy to manufacture structure and gives excellent control flexibility with easy variation of both field current and armature current.

The operation of the flux switching machine has been described in published papers. In a paper "Low cost high power density, flux switching machines and drives for power tools", in IEEE IAS Annual Meeting 2003 by H. Pollock, C. Pollock, R. Walter and B. Gorti, the operation of the machine with field winding in both series and shunt configurations relative to the armature switching circuit is described. In a paper "Flux switching machines for automotive applications" by C. Pollock, H. Pollock, R. Barron, J. Coles, D. Moule, A. Court, R. Sutton, published in IEEE Transactions in Industry Applications Vol. 42 No. 5, September 2006, pp 1177-1184, the operation of the machine as a motor with bifilar armature windings is described.

FIG. 2 shows a further flux switching machine, also from the prior art, as described in a paper "A permanent magnet flux switching motor for low energy axial fans", Y. Cheng; C. Pollock and H. Pollock; Fortieth IAS Annual Meeting Conference Record, Volume 3, 2-6 Oct. 2005 Page(s):2168-2175. This motor is the four pole version of a two pole machine first described in a paper "Design principles of flux switch alternator," S. E. Rauch and L. J. Johnson, AIEE Trans., vol. PAS-74, pp. 1261-1268, 1955. The stator 30 of FIG. 2 employs four permanent magnet sections 31,33,35 and 37 interspersed between four laminated stator sections 32, 34, 36 and 38 each carrying a slot for the armature winding. As in the motor of FIG. 1 rotation of the rotor 11 causes a cyclical variation in the flux linking the armature winding and hence induces an emf in the armature winding. The emf is proportional to speed and unlike the machine in FIG. 1 the field flux produced by the permanent magnets cannot be altered significantly as there is no field winding. The machine of FIG. 2 therefore provides a machine of high efficiency since the magnetic field is produced without copper losses in a field winding. Flux switching machines which incorporate field windings and permanent magnets are also possible as disclosed in UK Patent Applications 0721074.3 and 0721077.6.

Operation of all the prior art flux switching machines including those shown in FIGS. 1 and 2 as a motor or as a generator requires the current in the armature winding to alternate in synchronism with the internal emf induced within the armature winding due to the field flux. Armature current would be controlled during a positive and negative conduction block, the frequency of current reversals from a positive armature conduction block to a negative armature conduction block determined by the required speed of rotation of the rotor and the magnitude of the current in each armature conduction block determined by the torque requirement of the load, or may be simply limited by the speed of rotation of the machine and the size of the internal armature emf.

In order to control rotation of the rotor 11 relative to the stator 10, reversal of the direction of current flow in the windings of the armature windings must be synchronised with rotation of the rotor 11 relative to the stator 10. In order to control the switching of the current through the armature windings, therefore, existing flux switching motors needed to be provided with means for indicating the rotational position of the rotor 11. This was usually an optical or magnetic position sensor mounted to the rotor shaft, the operation of which will be familiar to persons skilled in the art and will therefore not be described in more detail. Such position sensors need to be very accurately aligned during manufacture of the motor, which in turn significantly increases the cost of manufacture of the motor.

WO 2004/025822 discloses a flux switching motor in which switching of the polarity of voltage pulses applied to the armature coils of the motor can be controlled without the use of a mechanical rotor position sensor. Since a flux switching motor has field coils and armature coils, each with a pitch double that of stator teeth, the magnetic fields generated in one coil link through an adjacent coil. As a result of this overlap, there is significant mutual inductance between the armature and field coils, the mutual inductance being dependent upon the rotational position of the rotor. This enables the rotational position of the rotor to be determined by monitoring voltages induced in the field windings as a result of current flow in the armature windings.

In WO 2004/025822 methods of maintaining synchronism with rotation of the rotor without use of a mechanical shaft sensor were described for low speed operation and for high speed operation. At low motor speeds, when current is controlled by pulse width modulation of the armature switches, the modulation of the armature switches throughout each armature conduction block was employed to control the value of the armature current. This technique is common in electrical drives for machines of all types and is known as pulse width modulation (pwm). WO 2004/025822 used the fact that excitation of the armature switches induced a voltage in the field winding which was a function of the mutual coupling between the field winding and the armature winding which in turn was a function of position. The induced voltage in the field winding then caused a variation in the gradient of the field current. A comparator was used to detect the polarity of the gradient of the field current when the armature switch or switches were on. When the polarity of the gradient of the field current in the on-state changed from positive to negative the controller would record that time as being the centre of the armature conduction block and a prediction could then be made for the required time for the reversal of the armature current direction. There are significant limitations of the methods disclosed in WO 2004/025822.

Firstly, under steady state conditions of load and speed, the detection method found the middle of the armature conduction block. It is therefore possible to predict the time to the end of the conduction block. However, if a motor is accelerating or if the load is fluctuating within each revolution or if there is a sudden change in the load, the speed of the motor within each armature conduction block will change dramatically and a significant error can occur in the prediction of the point in time to reverse the armature conduction. The method disclosed in WO 2004/025822 therefore can result in the motor stalling easily if the armature current is reversed too early or too late as negative torque is produced.

Secondly, if the power source to the power electronic drive is derived from a rectified ac supply, it is possible to have significant variation in the dc supply voltage. Under these circumstances it has been found that the field current will also contain a ripple current at the frequency of the rectified ac supply. This ripple current results in times when the current in the field winding rises continuously and then falls continuously as the ac voltage coming in to the rectifier decreases. The position information due to the rate of change of field current induced from the mutual coupling of armature excitation pulses into the field winding can be masked completely by these external factors which cause increases and decreases in the gradient of the field current. Measurement of the state of a comparator during the on-time of the switches returns a value of positive or negative gradient but does not distinguish between the sources of the field current gradient. Significant errors can therefore arise in the measurements and the control of the motor is not robust. This problem was recognised in WO 2004/025822 and a brief suggestion was made to use a low pass filter to apply the low frequency variation of the field current to the reference terminal of the comparator to reduce this problem but such methods have been found to be difficult to set up with the filter having to be very accurately set up to distinguish between supply frequency variation and variations due to motoring operation over a very wide speed range, with frequencies above and below the supply frequency variations.

Thirdly, operation of the methods in WO 2004/025822 at high duty ratios of pwm has been found to produce unreliable position information. In some flux switching machines the field windings are in series with the armature switching circuit. At high duty ratios the armature current is equal to the field current for most of the armature conduction block and the prior art sensing scheme fails completely. The methods in WO 2004/025822 cannot therefore be applied in conjunction with high torque low speed operation or rapid acceleration from rest.

European Patent Application EP1783891 provides an improvement to WO 2004/025822 which is particularly beneficial when there is significant changes in the voltage across the armature winding. EP1783891 recognises that the induced rate of change of field current is a function of both the armature supply voltage as well as the mutual inductance between armature and field windings. EP1783891 uses a division method to eliminate the variation in armature supply voltage in a differentiator coil to leave a signal, the variation in which is strongly related to position.

However reference to the text associated with FIG. 19 of EP1783891 states that:

"In the second part of each armature current pulse the signal 212 is less well determined. This is because this trace 212 is representative of a flux switching motor in which the field and armature windings are series connected. As the armature current rises during each pulse (in either the positive or negative sense) a point is reached when the magnitude of the armature current is equal to the field current. The remainder of the pulse is then electrically different with the armature and field windings forming a direct electrical series circuit. The rate of change of field current in the field and armature windings become equivalent and the mathematical equations useful for determining the position of the rotor no longer apply."

Therefore there is no solution drawn from the prior art which provides for the detection of the position of the rotor of a flux switching machine as the rotor approaches the position where it is aligned with the stator teeth without using a mechanical shaft position sensor.

It is the object of this invention to provide a method of operation of a flux switching machine without the use of a mechanical position sensor which can operate over the entire range of motor operating conditions and can deliver high and controlled torque, operate under conditions of rapidly changing loads or speeds and operate when the current in the machine is changing rapidly due to voltage variations or fast accelerations. The present invention will overcome the limitation of the prior art methods by specifically overcoming the limitation of EP1783891 which prevented the extraction of useful position information in the second half of the armature current conduction block.

According to a first aspect of the present invention there is provided an electrical machine for converting electrical energy into mechanical energy and/or mechanical energy into electrical energy, the machine comprising:

a rotor having a plurality of rotor teeth;

a stator having a plurality of stator teeth for rotatably receiving said rotor and having (i) at least one field magnet device for generating a first magnetomotive force between said rotor and said stator and including at least one first electrical winding, and (ii) at least one armature magnet device including at least one second electrical winding adapted to carry electrical current varying in synchronism with rotation of said rotor relative to said stator to generate a second magnetomotive force having a component transverse to said first magnetomotive force;

at least one control device for controlling supply of electrical current to or from the or each said second electrical winding by applying a sequence of switching cycles wherein the electrical current in the or each said electrical winding has positive and negative conduction blocks, each of the said conduction blocks has at least two regions, including a first region and an end region; and at least one rotor position sensor device for detecting at least one electrical signal related to the rotational position of the rotor relative to the stator and induced in a respective said first or second electrical winding as a result of a current passing through a respective second or first electrical winding, wherein at least one said rotor position sensor device comprises the steps of measuring the said electrical signal during a switching cycle in the end region, and comparing the said measurement with at least one similar measurement in at least one previous switching cycle to determine if a known rotor position has been reached.

According to a second aspect of the present invention there is provided an electrical machine according to this invention wherein the duty ratio of the switches controlling the or each said second electrical winding in the first region is greater than the duty ratio of the switches controlling the or each said second electrical winding in the end region.

According to a third aspect of the invention the at least one said rotor position sensor device comprises the steps of measuring the said electrical signal during each switching cycle in the end region, and comparing the said measurement with at least one similar measurement in at least one previous switching cycle to determine if a known rotor position has been reached.

According to a yet further aspect of the invention the at least one said rotor position sensor device comprises the steps of measuring the said electrical signal during two different states of a switching cycle in the end region, determining the difference between the measurements taken in each of the two states and comparing the said difference with at least one similar measured difference in at least one previous switching cycle to determine if a known rotor position has been reached.

In a further aspect of the invention an electrical machine can be controlled using a rotor position sensor device wherein at least one rotor position sensor device for detecting at least one electrical signal related to the rotational position of the rotor relative to the stator and induced in a respective said first or second electrical winding as a result of a current passing through a respective second or first electrical winding, wherein at least one said rotor position sensor device comprises the steps of making at least one measurement of the said electrical signal during a switching cycle in the end region, and comparing the said measurement with at least two similar measurements in at least two previous switching cycles to determine if a maximum or minimum value of the measurement has occurred.

Preferred embodiments of the present invention will now be explained with reference to the following Figures in which.

Figure 1:
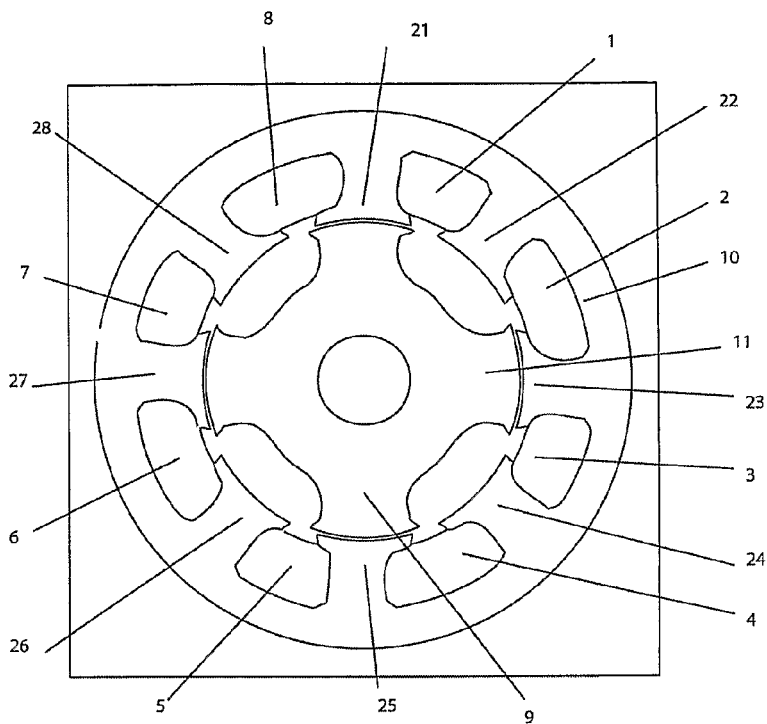
FIG. 1 and FIG. 2 shows a prior art flux switching machines.
Figure 3:
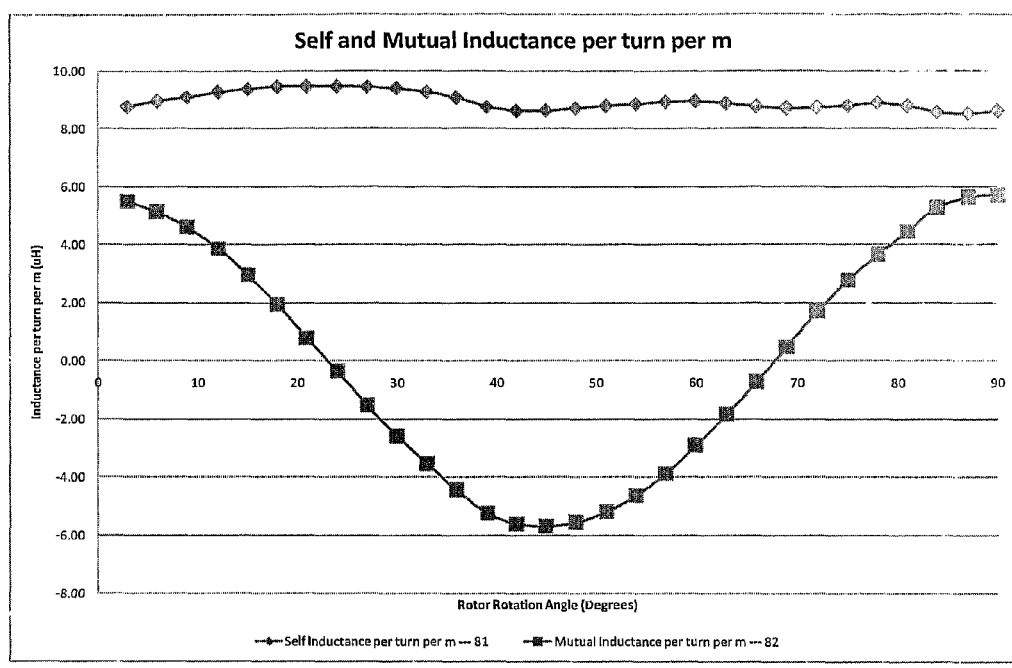
FIG. 3 shows a plot of the variation in self and mutual inductance in the field and armature windings of a typical flux switching machine such as the one shown in FIG. 1

FIG. 3 shows a plot of the variation in self and mutual inductance in the field and armature windings of a typical flux switching machine such as the one shown in FIG. 1. The graph shows Line 81 which is the self inductance in μH per turn and per metre of stack length for the field winding and the armature winding. Since both the field winding and the armature winding span two stator teeth and both span one rotor pole pitch the flux linking the winding due to its own current is relatively constant. The small variation with rotor angle can be explained by variations due to fringing at the edges of the teeth. The self inductance of the field or the armature offers very limited possibility for position dependent information. The graph also shows Line 82 which is the mutual inductance between field winding and armature winding in μH, per turn per m. The mutual inductance is strongly position dependent varying from a positive maximum near to 0° to a negative maximum near to 45°.

The torque in a flux switching motor is given by:

$$T = \frac{1}{2} i_a^2 \frac{dL_a}{d\theta} + \frac{1}{2} i_f^2 \frac{dL_f}{d\theta} + i_a i_f \frac{dM}{d\theta}$$

Since the self inductance of the windings are relatively constant there is little torque produced by the variation in self inductance. The rate of change in mutual inductance creates the possibility for torque production so the torque in a flux switching machine with armature and field windings can be approximated by:

$$T = i_a i_f \frac{dM}{d\theta}$$

Therefore when the rate of change of mutual inductance with respect to increasing rotor angle is positive, and if field current and armature current are both positive, then positive torque will be produced. Positive torque will act to turn the rotor to positive increasing angle.

When the rate of change of mutual inductance with respect to increasing rotor angle is negative, field current is positive but armature current is negative, then positive torque will again be produced. Positive torque will act to turn the rotor to positive increasing angle. With dc field current, in order to maintain torque in the positive direction the armature current must be reversed when the rate of change of mutual inductance changes sign. The changes in the polarity of the armature conduction blocks should therefore occur at the maximum and minimum values of the mutual inductance characteristic in FIG. 3 while operating the machine over its full range of current and speed. Unfortunately all the prior art methods have failed to provide a method to detect the maximum or minimum values of the mutual inductance characteristic. The prior art methods have described methods to detect the mutual characteristics just after the armature current has reversed or have detected the change in sign of the mutual coupling from positive to negative or from negative to positive. The present invention provides a method to accurately detect the occurrence of the maximum and minimum values of the mutual coupling between armature and field winding while also providing a method to deliver high current to the armature and field windings and high torque output from the motor or generator.

Figure 4:
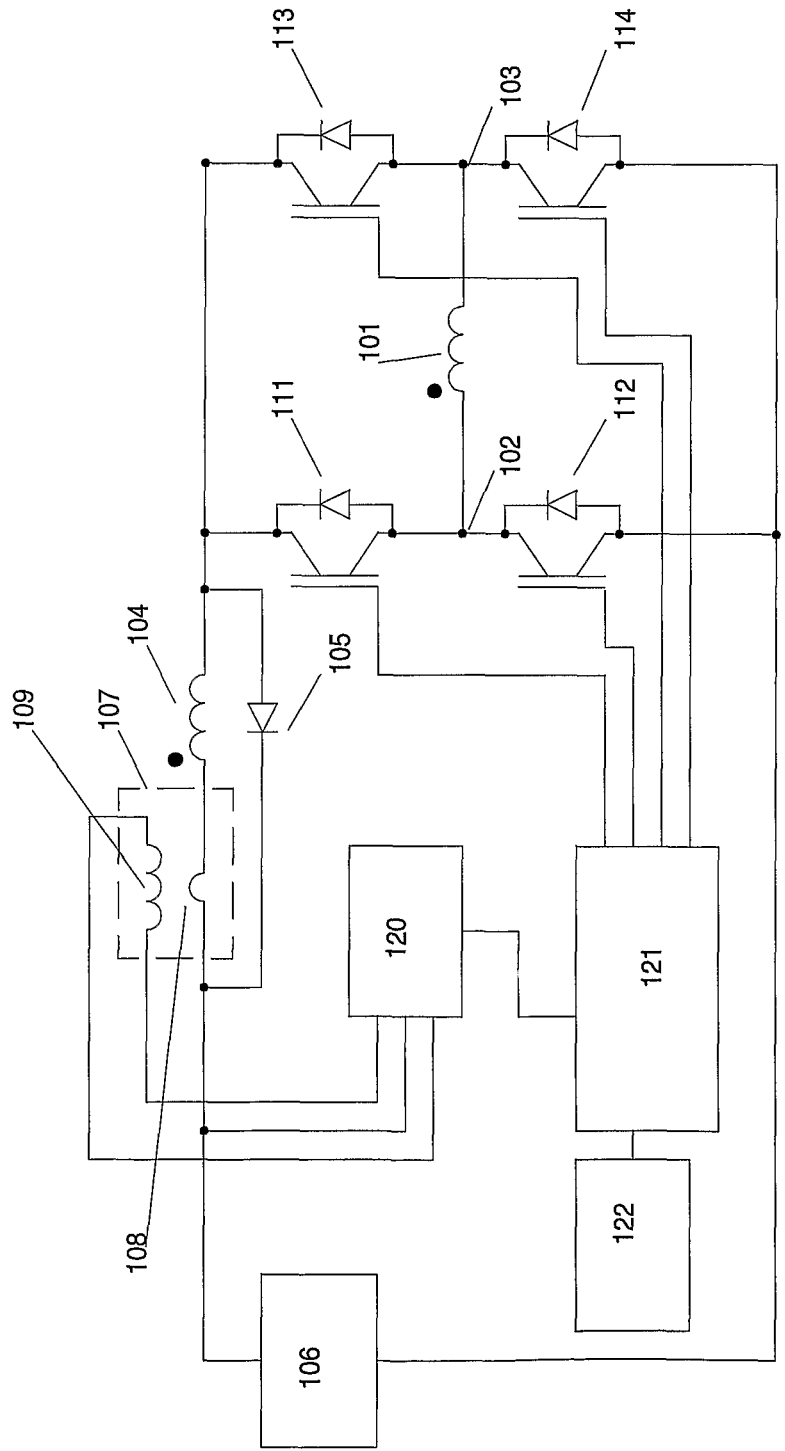
FIG. 4 shows a control circuit for a flux switching machine incorporating one aspect of the invention.

FIG. 4 shows a control circuit for a flux switching machine incorporating one aspect of the invention. An armature winding 101 of a flux switching motor is connected to the first 102 and second 103 switching nodes of a power electronic inverter. Each leg of the inverter comprises two power electronic switches. FIG. 4 shows these switches as insulated gate bipolar transistors though mosfets or other semiconductor switches can be used. The field winding 104 of the flux switching motor is connected in series with the power supply connection to the power electronic inverter. A diode 105 around the field winding provides an additional current path when field current is greater than armature current or when armature switches are turned off. The whole circuit is connected to a power source 106 which may be dc such as a battery or may be a dc power supply created from the rectification of an ac power supply. In either case it is not necessary for the dc power source to be smooth or constant. If the power supply is derived from rectification of an ac power supply it will be common to find a significant modulation of the dc voltage being supplied to the motor circuit.

FIG. 4 also contains a differentiating coil 107 for providing a signal related to the rate of change of the field current flowing in the field winding 104. The primary 108 of the differentiating coil is in series with the field winding 104 and carries the field current. The secondary 109 of the differentiating coil 107 links the flux associated with the field current flowing in the primary 108 and is connected to the sensorless conditioning circuit 120, details of which will be described later. The voltage across the secondary of the differentiator coil 107 is therefore directly related to the rate of change of field current. The signals produced by the sensorless conditioning circuit 120 are passed to a signal controller 121. The signal controller 121 also receives information from an application controller 122 which may be as simple as on/off commands but in more complex motor drives may issues requests for operating speeds or operating torques. The signal controller 121 uses the information from the sensorless conditioning circuit 120 to determine the required switching states of the switches 111, 112, 113 and 114 in the power electronic inverter, in order to control the motor to follow as closely as possible the requirements of the application controller 122. In motor circuits where there is variation in the value of the dc supply voltage provided to the circuit it is advantageous to have an additional connection between the dc supply voltage and the sensorless conditioning circuit 120 so that the value of the dc supply voltage can be monitored.

Figure 2:
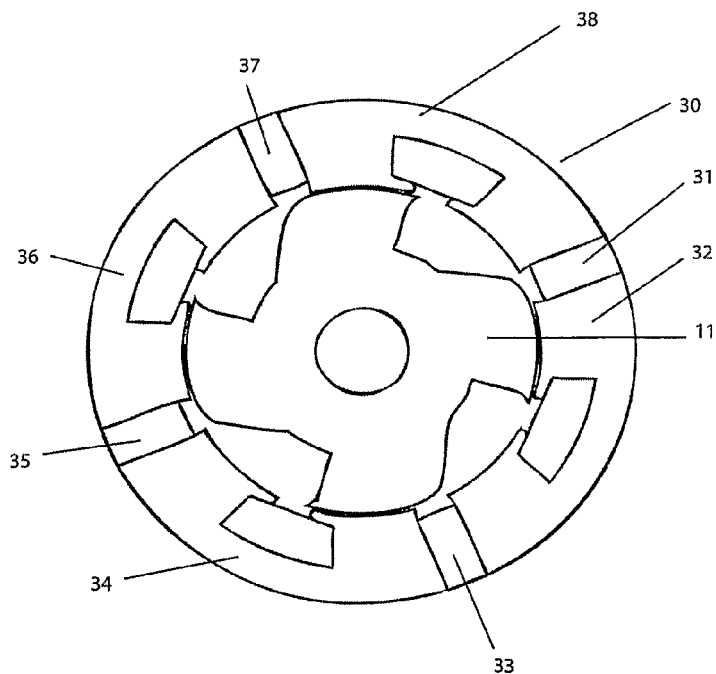
Figure 5:
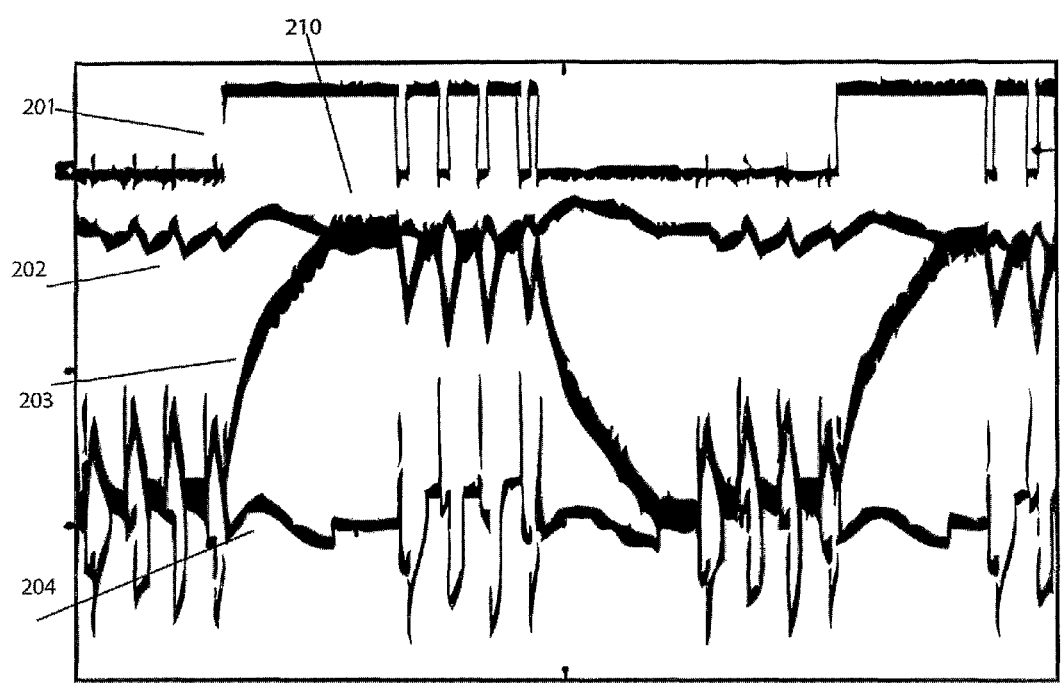
FIG. 5 shows the current and voltage waveforms of a motor operating according to the present invention.

The operation of the circuit in FIG. 4 according to the present invention will now be described with reference to FIG. 5. FIG. 5 shows the current and voltage waveforms of a motor operating according to the present invention. Trace 201 (10 V per division) shows the output signal which could be applied to both switches in one diagonal pair of the power electronic inverter switches, for example switches 111 and 114. When switches 111 and 114 are turned on by the high state of Trace 201 in FIG. 5, node 102 is connected to the positive supply rail of the power source via the field winding 104. Node 103 is connected to the less positive (usually referred to as zero) supply rail of the power source. A current may therefore flow from the positive supply rail through the field winding and the armature winding returning to the zero supply rail of the power source. During normal rotation of the motor the field winding will have a substantially dc component (Trace 202 in FIG. 5 shows the field current on a scale of 20 A per division relative to a zero in the centre of the screen), whereas the armature current will have times of positive current alternating with times of negative current (Trace 203 in FIG. 5 shows the armature current on a scale of 20 A per division relative to a zero in the centre of the screen). In a flux switching motor such as illustrated by FIGS. 1 and 2, where there are 8 stator teeth and 4 rotor teeth the current in the armature would reverse with every 45° of rotor rotation. It can also be observed in FIG. 5 that in the circuit of FIG. 4 it is not possible for the armature current to exceed the value of field current since they are series connected. Trace 204 (1V per division) shows the voltage induced across the secondary terminals of the differentiator coil 107. This signal is representative of the rate of change of field current 202.

The purpose of a sensorless controller for a flux switching motor is to determine the ideal points for the reversal of the armature current while also maintaining the required speed and torque. Each cycle of armature current is divided into a positive armature conduction block and a negative armature conduction block. According to a first aspect of this invention, each armature conduction block is divided into at least two regions, including a first region and an end region with optional additional regions interspersed between the first and end regions, characterised by the fact that average duty ratio of the inverter switches is higher in the first region than in the end region. The first region will typically have a higher average current than the subsequent regions and the end region. The main purpose of the first region is to establish sufficient armature current to ensure that the torque produced by the motor over the armature conduction block will be as close as possible to the torque required by the application controller. The main purpose of the end region is to provide a suitable excitation source for the armature to induce the most appropriate feedback signals into the differentiator coil 107 and to monitor signals collected by the sensorless conditioning circuit with the aim of determining the most appropriate point in the rotor rotation to complete the end region and to reverse the polarity of the armature current and to start the first region of the next armature current. The optional additional regions interspersed between the first region and the end region allow a more gradual transition in the duty ratio of the switches from the first region to the end region, thus providing a greater opportunity to control the shape of the armature current waveform and to set up the correct conditions for the optimal operation of the signal controller monitoring the sensorless conditioning circuit in the end region.

There are no intermediate regions in FIG. 5 and the operation has been simplified as only the start region and end region are required for basic operation according to the invention. For many applications this will be sufficient for operation of the motor. Trace 201 shows that the gate signals to transistors 111 and 114 are taken to a high or "on" condition. Current builds up rapidly in the armature winding in a positive direction (Trace 203). Initially the value of the armature current will be less than the field current as the field current (Trace 202) maintains a positive dc value during times when the armature current reverses. When the armature current reaches the field current value at point 210 the gradient of the armature current decreases sharply. The field current and armature current are now equal and are connected in series across the supply voltage. The diode 105 now stops conducting and there will be a sharp drop in the voltage applied across the armature winding as a significant voltage is dropped across the field winding. The inductance of both armature and field windings and the internal back emf of the armature winding oppose the build up of the current and the rate of rise of current decreases and may in some cases become negative. Significant torque is produced by the motor in this region because both the armature and field windings carry high levels of current and the rotor is part way between alignment with one set of stator teeth and the alternate set of stator teeth. It is advantageous to have high current levels in the middle of the armature current pulse and this requires high duty ratios on the armature switches in the first region of each armature conduction block. The length of the first region and the duty cycle chosen for the armature switches in the first region is determined by the speed, supply voltage and the requirements of the application controller. Typically the duty ratio of the armature switches will be chosen so that the transition between the first and end regions occurs between 20% and 80% of the armature conduction block.

On entering the end region the duty ratio of the armature switches is reduced so that there are times when the armature current (Trace 203) drops below the level of the field current (Trace 202). This is very important for the most effective operation of the differentiating coil 107 and signal controller 121. When one or both switches in the armature inverter are switched off, the current in the armature winding will fall rapidly under the influence of armature emf and lower or negative voltage applied to the armature winding. During this time the field current will be maintained in a path through the diode 105. Close inspection of the field current in trace 202 shows that the field current increases when the armature current decreases.

At a frequency and time determined by the signal controller the armature voltage will be reapplied building the armature current back up towards the level of the field current. The current may or may not reach the level of the field current before the process is repeated. While the armature current is rising back up again to the value of the field current, a current equivalent to the difference between the value of the field current and the armature current will be flowing in the diode 105. Therefore for a significant time in each of the switching cycles comprising the end region the voltage across the field winding is constant and equal to the diode forward conduction voltage. Trace 204 shows an example of the signal induced in the secondary of the differentiating coil 107. This signal is a direct representation of the rate of change of field current. At times when the voltage across the field winding is substantially constant, clamped by the diode, changes in the rate of change of field current are caused by the application of voltage pulses to the armature winding, which through mutual coupling between armature and field induce variations in the gradient of the field current. As the rotor moves towards a position where rotor teeth overlap a set of stator teeth, the mutual coupling increases in magnitude and the induced voltage in the secondary of the differentiating coil 107 increases reaching a maximum when the mutual coupling between the armature and the field reaches a maximum. This is the point where the armature current needs to be reversed.

The operation of the signal controller in the detection of the maximum value of the differentiating coil will now be explained in more detail with reference to FIG. 6 which is an expanded view of three cycles of the armature switching during the end region. The signal applied to the armature switches 111 and 114 is shown in Trace 238. Armature switches 112 and 113 are both off. The armature current is illustrated schematically by trace 240. Each pwm cycle of the armature switches will have two or more states. In the typical example illustrated by FIG. 6 there are three operating states in each pwm cycle. The states are 250, 251 and 252. State 250 occurs when both the switches in the armature inverter are switched off. The armature current is decreasing and is below the level of the field current. The field current (Trace 239) is flowing in the diode 105 and the voltage across the field winding is clamped to the diode forward voltage. State 250 will be referred to as an off-state. Most significantly, the field current actually rises during this time due to the mutually induced voltage between armature and field. The negative armature voltage during an off-state in the end region of a positive armature conduction block induces a negative voltage within the field which makes it easier for field current to flow causing a positive rate of change of field current.

State 251 immediately follows an off-state and occurs when the armature switches are turned back on to start to increase the current in the armature winding. In State 251 the difference between the field current and the armature current flows in the diode 105 and the voltage across the field winding is still clamped to the diode forward voltage. State 251 will be referred to as an on-state. As the rotor approaches maximum mutual inductance position, during the state 251 in a positive armature conduction block, the on-state causes a positive rate of change of armature current and the induced voltage in the field winding is also positive. The positive induced voltage in the field winding opposes the flow of field current which therefore causes a negative rate of change of field current during state 251.

Figure 6:
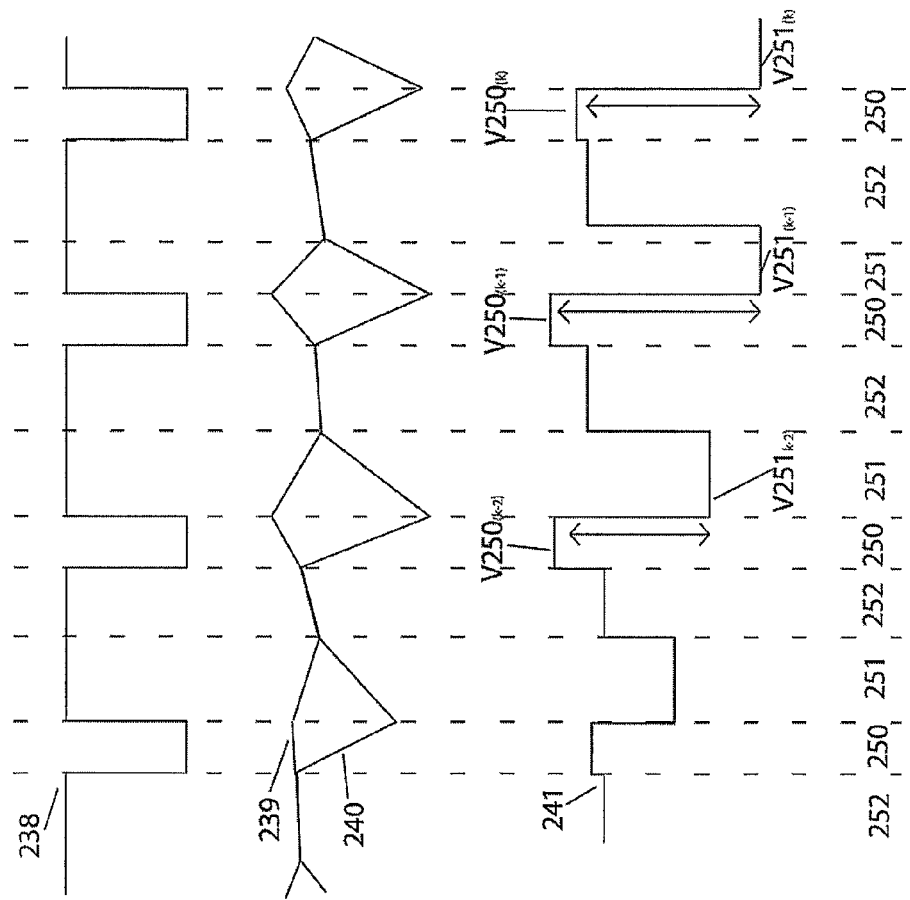
FIG. 6 is an expanded view of three cycles of the armature switching during the end region.

The final of the three states illustrated in FIG. 6 is State 252 which occurs if the armature current becomes equal to the field current and the diode 105 is therefore pulled out of conduction.

Trace 241 is typical of the voltage induced in the secondary of a differentiator coil 107 coupled to a conductor carrying the field current. This voltage is representative of the rate of change of field current. The rate of change of field current is controlled by two significant factors:

The voltage across the field winding;
The product of the voltage applied to the armature winding multiplied by the mutual coupling between armature and field.

Since the voltage across the field winding in states 250 and 251 is the same (equal to the forward voltage of the diode 105), any change in the voltage induced in the secondary of a differentiator coil between states 250 and 251 is due to the change in the armature voltage between the off-state and the on-state. If the motor is running from a relatively constant dc source the magnitude of any change in the voltage induced in a differentiator coil between an off-state and an on state will be representative of the mutual coupling between armature and field windings.

Figure 7:
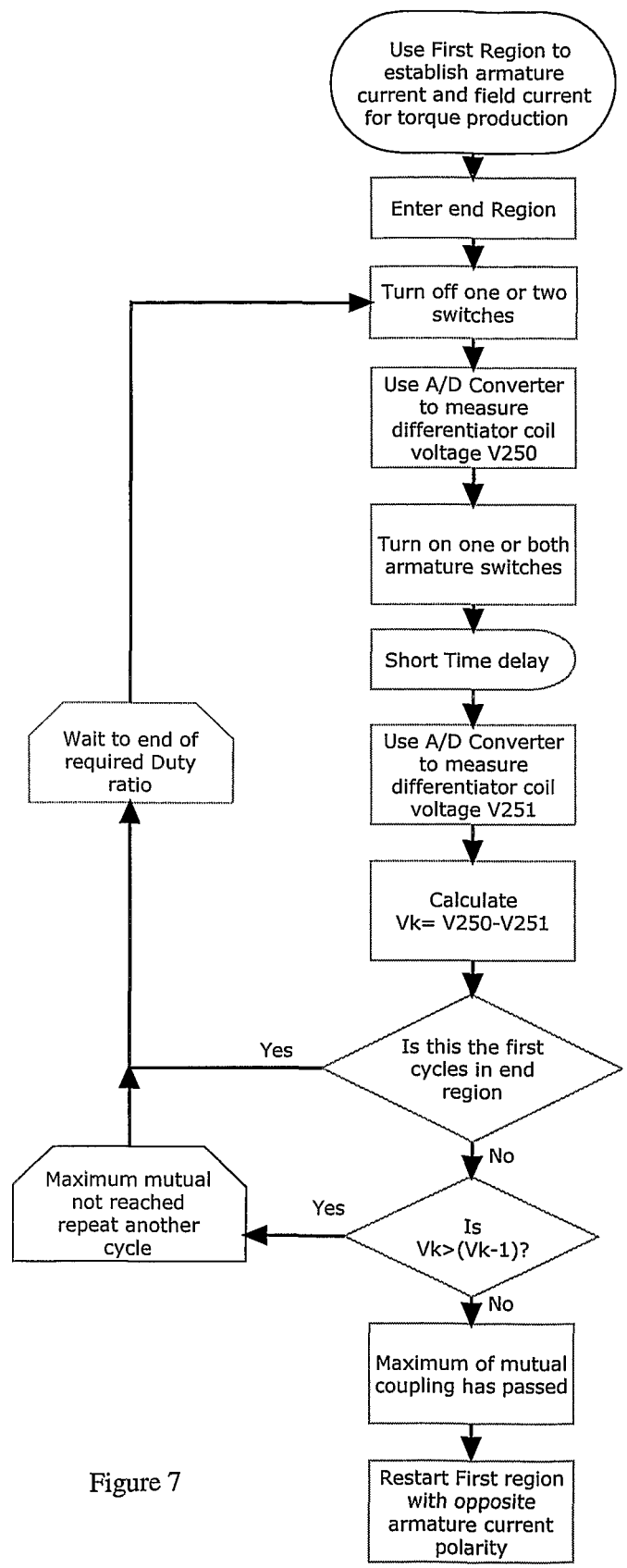
FIG. 7 shows a flow chart of the control of a machine according to the invention.

The signal controller can therefore determine the maximum value of the mutual coupling by following the flowchart in FIG. 7. After the first and intermediate regions of the armature conduction block have been completed, the end region is started and one or both armature switches will be turned off to effect a step reduction in the applied armature voltage, to enter an off-state 250. During state 250 the voltage across the differentiator coil 107 is measured, V250. After the prescribed duration of the off-state 250 one or both armature switches will be turned back on to create a positive step change in the armature voltage and initiate the on-state. It is advisable to wait a short time for the switching transient to settle and for the differentiator coil to settle to a value representative of the rate of change of field current in the on-state, 251. This on-state voltage is measured and stored as V251. The measurement of the voltages can be conveniently achieved using a microcontroller and analogue to digital converter or by analogue circuit techniques. The difference between voltages V250 and V251 is then processed to give:

$$V_k = V_{off\text{-}state} - V_{on\text{-}state}$$

$$V_k = V250_{(k)} - V251_{(k)}$$

where k represents the kth PWM cycle in the end region (and k-1, k-2, etc. represent the (k-1)th, (k-2)th, etc., PWM cycle in the end region, respectively).

Since the on-state reading, V251, is becoming more negative and the off-state reading, V250, is becoming more positive, $V_k$ will reach a positive maximum at the point when the armature excitation should be reversed.

If $V_k > V_{k-1}$ then it is known that the mutual coupling is still increasing in magnitude towards the maximum. The end region has not been completed and a further pwm cycle can continue.

During each subsequent pwm cycle making up the end region the processing is repeated until $$V_k < V_{k-1}$$

When this occurs the maximum magnitude of the mutual coupling has been reached and the polarity of the armature current should be reversed to start the first region with the opposite polarity of armature current.

The armature current may reach the field current value and state 251 will give way to state 252. Measurement of the differentiator coil voltage $V_{252}$ is not useful to extract position as the rate of change of field current is the same as the rate of change of armature current. The step change in the differentiator coil voltage which occurs between state 251 and state 252 is due to the diode around the field coming out of conduction and not due to any change in armature switching state.

Returning to FIG. 6 it can be seen that $V_{k-1} > V_{k-2}$ so no maximum found;

but $V_k < V_{k-1}$ so maximum coupling has been passed.

Since both $V_{off-state}$ and $V_{on-state}$ vary with the mutual inductance characteristic the maximum or minimum of the mutual inductance characteristic can be determined from a sequence of only one of these readings, though some signal integrity will be lost.

One important feature of this invention is the use of the difference between the on-state measurement and the off-state in the search for the maximum value. This automatically eliminates any influence of rates of change of field current due to other circuit voltages since comparison of the rate of change of field current immediately before and immediately after an armature switching transition can be attributed to that armature switching event. This is achieved by the reduction in duty ratio of the armature switches during the end region relative to the first region. Such a control scheme has the benefit of delivering the maximum current in the centre of the armature conduction block where the production of torque is most efficient, the current falling away slightly during the end region.

The disadvantages of the prior art is overcome by the application of the control method according to this invention.

The invention discloses a method for the detection of the maximum value of the mutual coupling which is coincident with the ideal point to reverse the armature current polarity without any negative torque. Even if there are significant changes in motor speed during any one armature conduction block, armature current polarity reversal will always occur very close to the ideal point.

In this invention the measurement of the differentiator coil voltage before and after an armature switching event allows the change in the field current gradient due to the specific armature event to be isolated from other effects due to variations in voltage around the field winding itself.

In this invention the use of at least two regions within each armature current conduction block provides for a first region which can have a current value set by the demands of the application and can have a value and duty ratio as high as required to produce the required torque and an end region with a lower duty ratio designed to create the correct conditions for the extraction of the position information.

The positional accuracy of the methods according to this invention are determined by the pwm frequency during the end region and the corresponding frequency of sampling the differentiator coil voltage. It is therefore advantageous to have a high pwm frequency during the end region. Since the magnitude of the current is typically lower in the end region than in the first region it is possible to have a high pwm frequency in the end region without incurring excessive losses in either the motor or the power electronics. It is possible to have a change in frequency between the first region and the end region. Furthermore as the speed increases the first region may have a long block with no switching at all delivering maximum power from the available supply voltage. As the rotor approaches the position of maximum magnetic coupling between armature and field windings, off-states can be introduced and high frequency sampling can be applied.

If a flux switching motor has 8 stator teeth and 4 rotor teeth and is rotating at 3000 r/min, the armature current frequency is 200 Hz. One electrical cycle of armature current is associated with a rotation of 90 mechanical degrees. End region PWM sampling at 20000 Hz will therefore provide updated position information every 0.9° and will be able to detect the ideal armature switching points within 0.9°. Even at rotor speeds of 9000 r/min the angular resolution will still be 2.7° in an electrical cycle lasting 90° mechanical. The analogue conversion speeds of an analogue to digital converter in a low cost microcontroller can easily convert both on-state and off-state samples at these data rates. The exact choice of switching frequencies and sample frequencies can be chosen by the designer to match the available electronic components, motor speeds and resolution required.

Figure 8:
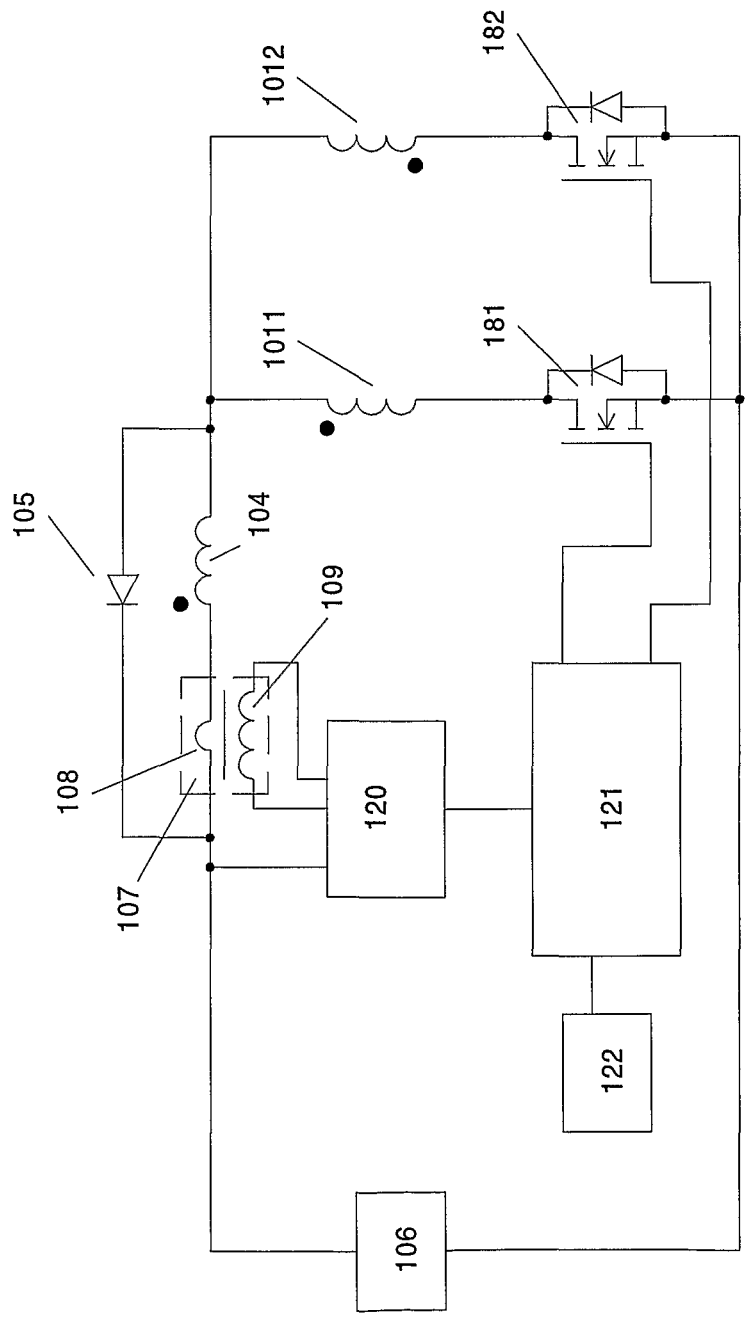
FIG. 8 and FIG. 9 show a further power circuits for the control of flux switching motors according to the invention.

The method according to this invention can be applied to other power circuit configurations suitable for the control of armature and field currents in the flux switching machine. In FIG. 8 a power source 106 supplies a motor controller according to the invention applied to a flux switching motor with field winding 104 and armature winding comprising two closely coupled windings 1011 and 1012. The closely coupled armature winding, sometimes known as bifilar windings were disclosed in U.S. Pat. No. 6,140,729. The circuit allows the motor to be controlled using only two power switches 181 and 182. According to aspects of this invention FIG. 8 also contains a differentiator coil 107 with primary 108 comprising a conductor carrying the field current and secondary 109 linking the flux associated with the primary, a sensorless conditioning circuit 120 and a signal controller 121. There may also be an application controller 122. The sensorless conditioning circuit 120 takes the voltage signal across the terminals of the secondary winding of the differentiator coil 107 and may adjust the scale of the signal and add a dc offset so that the signal is appropriately within the range of an analogue to digital converter in the signal controller 121. Furthermore the sensorless conditioning block may include a simple filter to remove unwanted high frequency noise. The signal controller 121 may be a micro-controller with an analogue to digital converter or may be an application specific digital or analogue controller. Implementation of the invention in this circuit is identical to the previous description characterised by having a armature current which has to be reversed in polarity in synchronism with particular positions of the rotor, each armature current cycle being divided into positive and negative armature conduction blocks, characterised by each armature conduction block having a first region, optional intermediate regions, and an end region. According to the invention the duty ratio of the switches 181 or 182 will be higher in the first region than in the end region such that the first region produces a significant proportion of the required torque and the end region establishes the correct conditions for the sampling of the signals from the sensorless conditioning circuit to locate the maximum amplitude of the mutual inductance between armature and field winding and to determine the ideal rotor position to reverse the polarity of the armature current.

The circuit of FIG. 8 is particularly suited to the operation according to the patent since switching off of switches 181 or 182 causes an avalanching of the power mosfet and a small amount of energy is dissipated in the device with each turn off transition. According to this invention the mosfet can be used with continuous conduction in the first region, delivering maximum current with no avalanche losses. The duration of the first region relative to the whole armature conduction block can be adjusted to control the torque. A dead time when neither armature switch is on at all can also be inserted after an end region and before the start of the first region of opposite polarity. This may be useful under lightly loaded conditions where the torque requirement is small. On entering the end region which will usually occur between 20% and 80% of the way through the armature conduction block the mosfet switches will be modulated at the chosen duty ratio and the sampling of off-state and on-state voltages on the differentiator coil (modified as required by the sensorless conditioning circuit), will begin to find the maximum amplitude of the mutual coupling. There can be some intermediate regions between the first region and the end region to shape the current pulse.

Figure 9:
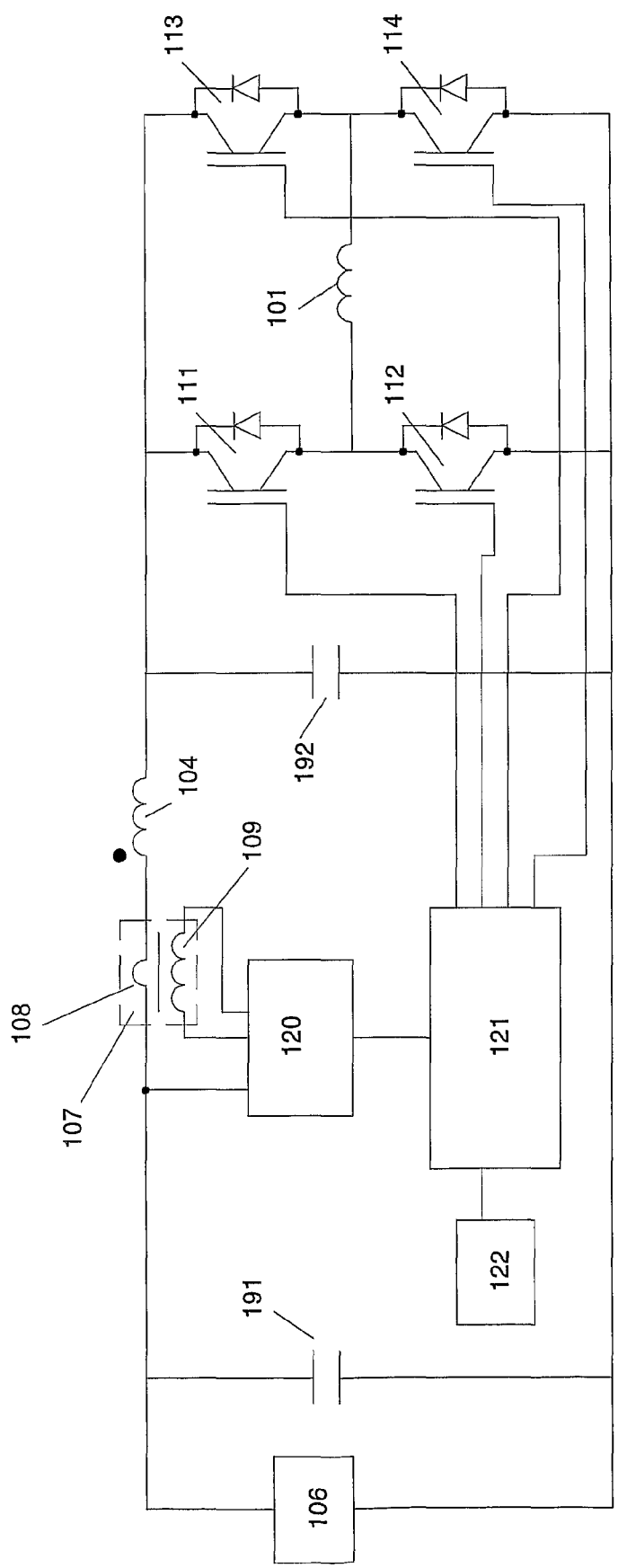

In FIG. 9 a power source 106 supplies a motor controller according to the invention applied to a flux switching motor with field winding 104 and armature winding 101 in a full bridge inverter with 4 IGBTs 111, 112, 113, 114. In FIG. 9 there is no diode around the field winding to carry current when the field and armature currents are different. Instead, two capacitors 191 and 192 are used to allow a path for field current to flow when it is greater than the armature current. Capacitor 192 also absorbs armature current when the armature switches are turned off. According to aspects of this invention FIG. 9 also contains a differentiator coil 107 with primary 108 comprising a conductor carrying the field current and secondary 109 linking the flux associated with the primary conductor, a sensorless conditioning circuit 120 and a signal controller 121. There may also be an application controller 122. The sensorless conditioning circuit 120 takes the voltage signal across the terminals of the secondary winding of the differentiator coil 107 and may adjust the scale of the signal and add a dc offset so that the signal is appropriately within the range of an analog to digital converter in the signal controller 121. Furthermore the sensorless conditioning block may include a simple filter to remove unwanted high frequency noise. The signal controller 121 may be a microcontroller with an analogue to digital converter or may be an application specific digital or analogue controller. Implementation of the invention in this circuit is identical to the previous description characterised by having a armature current which has to be reversed in polarity in synchronism with particular positions of the rotor, each armature current cycle being divided into positive and negative armature conduction blocks, characterised by each armature conduction block having a first region, optional intermediate regions, and an end region. According to the invention the duty ratio of the switches eg. 111 and 114 will be higher in the first region than in the end region such that the first region produces a significant proportion of the required torque and the end region establishes the correct conditions for the sampling of the signals from the sensorless conditioning circuit to locate the maximum amplitude of the mutual inductance between armature and field winding and to determine the ideal rotor position to reverse the polarity of the armature current.

In the circuit of FIG. 9 it is possible that the size of capacitor 192 may be relatively small, perhaps in the region of 2 µF to 20 µF. This means that the voltage across the armature circuit may vary quite significantly within each armature conduction block and even within each pwm cycle. The method according to this invention is critical to delivering the required torque while also maintaining a system of extracting the position information from the differentiating coil 107.

Figure 10:
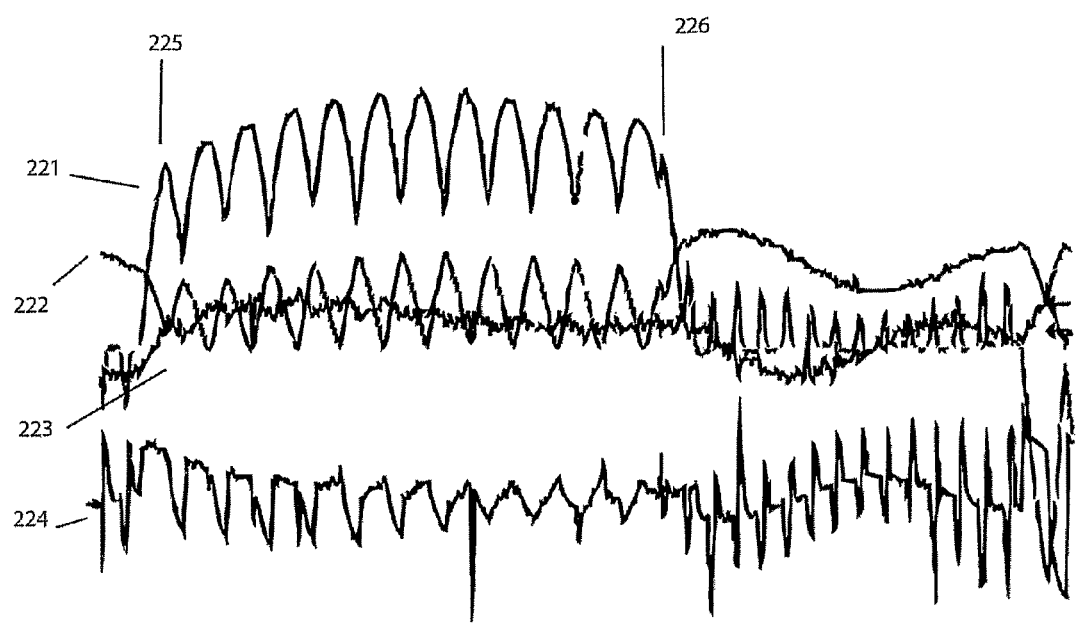
FIG. 10 shows an example of the voltage and current in a motor controlled by a circuit according to FIG. 9.

In the first region of a positive armature conduction block the switches 111 and 114 can be turned on with a duty ratio appropriate for the speed and torque requirements of the motor. The armature current will build up rapidly and will usually exceed the value of the field current and the voltage on capacitor 192 may fall rapidly during this time. FIG. 10 shows an example of the voltage and current in a motor controlled by a circuit according to FIG. 9. In the particular motor capacitor 192 was 5.6 µF. Trace 221 is the armature current during a positive conduction block on a scale of 10 A/div with zero armature current on the centre line of the plot. Trace 222 is the voltage across capacitor 192 on a scale of 200 V/div with 0V being on the centre line. Trace 223 is the field current on 10 A/division using the centre line as 0 A. Trace 224 is the voltage induced on the secondary winding of the differentiator coil 107 linking a field current conductor.

The first region extends for more than half the positive armature conduction block, running from point 225 to 226. The armature switches are modulated during this time to control the armature current. Within each pwm cycle there is a sharp drop in the voltage on capacitor 192 (Trace 222). Unlike the earlier examples in FIGS. 5 and 6, the field current (Trace 223) is much smaller than the armature current but still has an average dc value.

At point 226 the duty ratio of the armature switches is reduced as the end region begins according to the invention. The armature current drops. The pwm frequency is also increased to improve angular resolution according to a further aspect of the invention. The reduction in armature current allows the voltage on capacitor 192 (Trace 222) to recover to a higher level. The armature voltage is now available to create mutually induced signals in the field winding. The induced signals are detected in the Trace 224 from the differentiator coil. This signal can be sampled before and after a turn on transition to determine the mutual inductance and to find the maximum value.

In order to achieve correct operation of the method according to the invention during the end region it is essential that there is some voltage on the capacitor 192 during the end region. If this is not the case, switching of the armature switches will not apply a voltage transition to the armature and there will therefore be no voltage induced in the differentiator coil due to the mutual coupling between the armature and the field windings. No position information can therefore be calculated. By entering the end region and reducing the duty ratio of the switches some of the armature current will be directed back into the capacitor 192, along with the field current. The voltage on capacitor 192 will start to rise and it will be possible to sample the differentiator coil signal in the off-state and in the on-state and to determine the step change in the gradient of the field current which is excited by each armature switching step. Trace 223 shows that the field current reverses during the end region due to resonance between capacitors 192 and 191 but the methods according to the invention will still work.

The methods according to this invention may be used as part of an overall control scheme. For example the methods according to this invention are particularly useful during acceleration of the motor from rest. When the motor has reached a suitable speed the signal controller may change to an alternative control scheme. However, the methods according to the invention will still be very important to obtaining the fastest acceleration without losing synchronism with the rotor.

The methods according to the invention are applicable to flux switching motors and generators. In a flux switching generator the direction of armature current will be the opposite of that in a motor relative to the rate of change of the mutual inductance between armature and field. Turning on an armature switch in the end region of the armature conduction block in a flux switching motor generates a mutually coupled voltage in the field which tends to create an increasingly negative rate of change of field current as the rotor turns towards the point of maximum mutual coupling. Turning on an armature switch in the end region of the armature conduction block in a flux switching generator generates a mutually coupled voltage in the field which tends to create an increasingly positive rate of change of field current as the rotor turns towards the point of maximum mutual coupling.

Application of this invention to a flux switching generator therefore requires the subtraction of on and off readings to be reversed. The voltages V250 (off-state) and V251 (on-state) are measured in the same way as in a motor and then processed to give:

$$V_k = V_{off\text{-}state} - V_{on\text{-}state}$$

$$V_k = V250_{(k)} - V251_{(k)}$$

where k represents the kth PWM cycle in the end region. This represents the off-state reading subtracted from the on-state reading. Since the on-state reading, V251, is now becoming more positive and the off-state reading, V250, is becoming more negative, $V_k$ will reach a positive maximum at the point when the armature excitation should be reversed.

If $V_k > V_{k-1}$ then it is known that the mutual coupling is still increasing in magnitude towards the maximum. The end region has not been completed and a further pwm cycle can continue.

During each subsequent pwm cycle making up the end region the processing is repeated until $$V_k < V_{k-1}$$

When this occurs the maximum magnitude of the mutual coupling has been reached and the polarity of the armature current should be reversed to start the first region with the opposite polarity of armature current. The invention can therefore be applied to a flux switching generator with very minor adaption of the mathematics. The invention is particularly useful in a generator since the reduction of the armature duty ratio during the end region is also particularly effective in returning energy from the armature to the dc supply. Application of this invention can therefore deliver accurate position information while also helping with the conversion of mechanical energy to electrical energy.

A further aspect of the invention is to use line-fitting techniques to combine the measurements taken over several switching cycles. A line fitting equation can be used to link together a number of sample measurements and to calculate the gradient of the line. A maximum or minimum can then be reliably determined by a change in sign of the gradient. This aspect of the invention is particularly useful at low speeds. At low speeds there can be very small difference between the measurements taken in successive switching cycles as there is a very small change in the rotor angle. Due to the limited resolution of the analogue to digital converters, electrical noise may create changes in measurements greater than the real changes being measured. By creating a best line of fit through a sequence of readings, for example 11 or 13 readings, the electrical noise will be smoothed out and the trend in the signal can be observed with more confidence. As the speed of the motor increases and the time duration of the end region decreases it is convenient to reduce the number of points in the best line of fit until individual readings are used as described with reference to FIG. 6.

The line fitting techniques are also useful if the position of reversal of the armature current is to be adjusted to be earlier or later than the actual maximum or minimum of the mutual inductance characteristic. Rather than triggering the armature current reversal when the best line of fit has zero gradient the trigger level can be set to be before or after the gradient of the best line of fit passes through zero. This is much more reliable than setting a particular value of mutual inductance to trigger a reversal since absolute values are subject to measurement inaccuracy, temperature variations, component tolerances etc. The method according to this invention can therefore work across a wide range of motor tolerances and operating temperatures without compensation.

All aspects of the invention described have employed a differentiator coil as a convenient way of determining the rate of change of current in a winding. The invention can be applied equally well to a circuit which determines the rate of change of current using other methods. This may comprise steps of measuring the current at two or more successive intervals and determining the change in the current over these intervals. Alternatively an analogue differentiator circuit can be used.

Another suitable method to obtain the rate of change of a current is to measure the time taken for the current to change by a preset amount. This can be a useful method for use in a low cost microcontroller where a timer is readily available.

Figure 11:
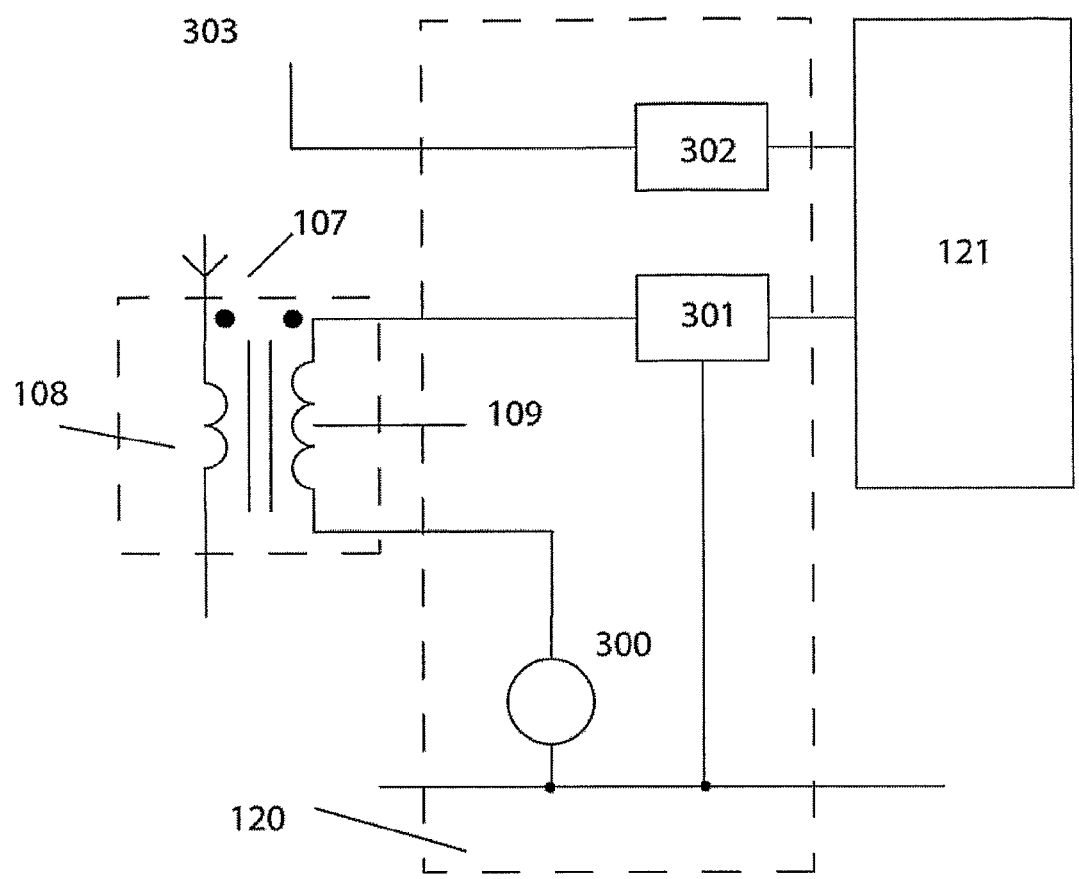
FIG. 11 shows the Sensorless Conditioning Block 120 in more detail.

FIG. 11 shows the Sensorless Conditioning Circuit 120 in more detail. The secondary winding 109 of the differentiator coil 107 has two terminals. The first terminal would typically be connected to a zero or reference voltage 300 which ensures that a dc offset can be added to the differentiator coil output voltage on the second terminal. Since the voltage induced across the terminals of the differentiator coil secondary winding 109 is both positive and negative it is useful to add an offset 300 to make the signal always positive. This is because the measurement of the signal magnitude in the signal controller 121 is usually achieved with an analogue to digital converter with a positive voltage range. The dc offset 300 therefore allows positive and negative rates of change of field current to be measured in a simple analogue to digital converter. The signal at the second (positive) terminal of the secondary winding 109 may also pass through a filter and/or attenuation/amplification block 301 before it is passed to the signal controller 121. Since the signal controller subtracts successive signals the dc offset is eliminated from the measurements.

The sensorless conditioning unit may also receive a signal 303 which may also pass through a block 302. Block 302 may contain filters, amplifiers or attenuators and may also add or subtract voltage offsets. The signal 303 may be representative of the dc supply voltage or the armature supply voltage. It may also be a signal representative of the rate of change of current in the armature winding since it is known that the rate of change of current in the armature winding is the cause of the induced voltage in the field winding.

The aspects of the invention can be applied to flux switching motors with more than one armature winding. The machines illustrated are effectively single phase machines as, whilst the armature is made up of multiple coils around the machine, there is one armature winding and single phase ac voltage is induced in the armature winding. A flux switching machine with eight stator teeth and either three or five rotor teeth can have two armature phases and a single field winding. The mutual inductance characteristic between each of the two armature phases and the field is displaced from the other by 90° electrical. A flux switching machine with twelve stator teeth and either five or seven rotor teeth can have three armature phases and a single field winding. The mutual inductance characteristic between each of the three armature phases and the field is displaced from the other by 120° electrical. Each of the three armature phases will have a mutual inductance variation which is displaced from the others by 120° electrical. Application of the invention to such machines follows exactly the same principles taking care to sample the rate of change of field current at times when the armature switching event which caused the induced effect in the field is known and can be related to the mutual inductance of a single armature phase or a pair of series connected armature phases. In the case of the three phase flux switching machine it is most likely that the three phases will be connected to a three phase inverter and that the armatures will be star or delta connected. In this case switching events in the inverter will change the voltage across two armature phase windings simultaneously. The induced effect in the field winding will then be the combined effect of the mutual coupling between both armature phases and the field winding. The signal controller will then contain the additional step of calculating the individual mutual couplings. Alternatively signal controller can control the armature excitation directly from the known combined mutual effects.

The detection of the position in a permanent magnet flux switching motor such as shown in FIG. 2 or as disclosed in a paper "Switching Flux Permanent Magnet Polyphased Synchronous Machines" by E. Hoang, A. H. Ban Ahmed and J. Lucidarme, published in the EPE'97 Conference proceedings pages 3.903 to 3.908 are also possible according to this invention. In such machines the field excitation is supplied completely by permanent magnets in the stator in the same position as the field winding of FIG. 1. Instead of the secondary of the differentiator coil coupling to flux associated with a conductor carrying the field current the secondary of the differentiator coil must link the field flux in the machine itself. This can be achieved by having the secondary of the differentiator coil spanning the air-gap surface of one of the stator steel sections carrying the armature coils and two stator teeth from one magnet position, say 31, to the next magnet position, say 33. The primary source of flux for the differentiator coil is then the field flux passing through either of the stator teeth spanned by each secondary coil and the voltage induced in the secondary coil will be the rate of change of the field flux which will contain changes set up by switching transitions of the armature phases, the magnitude of which will be directly related to position according to changes in mutual coupling of armature phases to the field winding. Such permanent magnet flux switching machines do not suffer from the limitations of field current being in series with armature current. However, the performance of the sensing scheme is enhanced dramatically by application of the invention whereby a first region of each armature conduction block is controlled according to the requirements of the application and an end region of each armature conduction block is used for repetitive sampling of the differentiator coil voltage to determine an ideal point for reversal of the armature current. Such a scheme provides for control of the permanent magnet flux switching machine at high currents and under rapid transient conditions. In the three phase permanent magnet machine it may be beneficial to have several secondary coils of the differentiator coil, each secondary linking a different section of the stator so that a full picture of the field flux in the machine is established. The signal controller may implement the invention by sensing the secondaries as a whole series connected unit or as individual coils.

All aspects of the invention have been explained by way of illustration only. It is possible to apply the aspects of the invention to monitoring rates of change of current in the armature winding, due to switching cycles in the field winding. This would be possible in a flux switching motor with a shunt field controlled with a separate switching transistor rather than the series connected field in the examples given.

The aspects of the invention described herein can also be applied to other electrical machines where there are changes in mutual coupling between the windings and where those changes are a function of position.

The invention claimed is:

1. An electrical machine for converting electrical energy into mechanical energy and/or mechanical energy into electrical energy, the machine comprising:
a rotor having a plurality of rotor teeth;
a stator having a plurality of stator teeth for rotatably receiving said rotor and having (i) at least one field magnet device for generating a first magnetomotive force between said rotor and said stator and including at least one first electrical winding, and (ii) at least one armature magnet device including at least one second electrical winding adapted to carry electrical current varying in synchronism with rotation of said rotor relative to said stator to generate a second magnetomotive force having a component transverse to said first magnetomotive force;
at least one control device for controlling supply of electrical current to or from the or each said second electrical winding by applying a sequence of switching cycles wherein the electrical current in the or each said electrical winding has positive and negative conduction blocks, each of the said conduction blocks has at least two regions, including a first region and an end region; and
at least one rotor position sensor device for detecting at least one electrical signal related to the rotational position of the rotor relative to the stator and induced in a respective said first or second electrical winding as a result of a current passing through a respective second or first electrical winding, wherein at least one said rotor position sensor device is configured to undertake the steps of measuring the said electrical signal during two different states of a switching cycle in the end region, determining a difference between the measurements taken in each of the two different states and comparing the difference with at least one similar measured difference in at least one previous switching cycle to determine if a known rotor position has been reached.

2. An electrical machine according to claim 1 wherein the duty ratio used for the control of the or each said second electrical winding in the first region is greater than the duty ratio used for the control of the second electrical winding in the end region.

3. An electrical machine according to claim 1 wherein the at least one said rotor position sensor device is configured to undertake the steps of measuring the said electrical signal during each switching cycle in the end region, and comparing the said measurement with at least one similar measurement in at least one previous switching cycle to determine if a known rotor position has been reached.

4. An electrical machine according to claim 1 wherein at least one rotor position sensor device for detecting at least one electrical signal related to the rotational position of the rotor relative to the stator and induced in a respective said first or second electrical winding as a result of a current passing through a respective second or first electrical winding, wherein at least one said rotor position sensor device is configured to undertake the steps of measuring the said electrical signal during an on-state or an off-state of a switching cycle in the end region, and comparing the said measurement with at least one similar measurement in at least one previous switching cycle to determine if a known rotor position has been reached.

5. An electrical machine according to claim 1 wherein the two different states of a switching cycle in the end region are an on-state and an off-state.

6. An electrical machine according to claim 1 wherein at least one rotor position sensor device for detecting at least one electrical signal related to the rotational position of the rotor relative to the stator and induced in a respective said first or second electrical winding as a result of a current passing through a respective second or first electrical winding, wherein at least one said rotor position sensor device is configured to undertake the steps of making at least one measurement of the said electrical signal during a switching cycle in the end region, and comparing the said measurement with at least two similar measurements in at least two previous switching cycles to determine if a maximum or minimum value has occurred.

7. An electrical machine according to claim 1 wherein at least one rotor position sensor device for detecting at least one electrical signal related to the rotational position of the rotor relative to the stator and induced in a respective said first or second electrical winding as a result of a current passing through a respective second or first electrical winding, wherein the frequency of measurement in the end region is higher than the frequency of current modulation in the first region.

8. An electrical machine according to claim 1, wherein the at least one electrical signal is representative of the magnitude of mutual coupling between the field magnet device and the armature magnet device.

9. An electrical machine according to claim 8, wherein the at least one rotor position sensor device is configured to determine that the known rotor position has been reached if the mutual coupling reaches a maximum value.

10. An electrical machine according to claim 8, wherein the field magnet device comprises a field winding, and wherein the at least one electrical signal is the value of the gradient of the current in the field winding.

11. An electrical machine according to claim 8, wherein the field magnet device comprises at least one magnet, and wherein the machine further comprises a coil configured to link the field flux in the machine itself, and wherein the at least one electrical signal is the value of the gradient of the current in the coil.

12. An electrical machine according to claim 11, wherein the at least one magnet comprises a plurality of magnets, and wherein the coil is located on an air gap surface of a section of the stator comprising two stator teeth from a first magnet to an adjacent magnet.

* * * * *